United States Patent Office 3,509,131
Patented Apr. 28, 1970

3,509,131
DIAZIRINE SUBSTITUTED CARBOXYLIC AMIDES
Robert Fitz Randolph Church, Riverside, Conn., and Martin Joseph Weiss, Oradell, N.J., assignors to American Cyanamid Company, Stamford, Conn., a corporation of Maine
No Drawing. Filed Dec. 30, 1966, Ser. No. 606,043
Int. Cl. C07d 45/00, 51/42, 51/70
U.S. Cl. 260—239        9 Claims

ABSTRACT OF THE DISCLOSURE

Diazirines containing alkanamides usually prepared from the corresponding diazirine containing acid chloride and an appropriate amine, are described. These compounds are useful for their diuretic, hypoglycemic, analgesic, hypotensive, antiinflammatory, hypochlolesterolemic and antibacterial activities. In addition, the compounds have been found to possess phychic stimulant and antidepressant activities.

---

This invention relates to novel diazirine compounds. More particularly, the invention relates to novel azo substituted carboxylic amide compounds. The invention is intended to include all physiologically acceptable acid addition salts of the novel compounds.

The novel compounds of this invention may be illustrated by the following general formula:

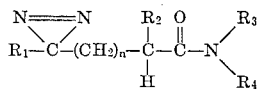

wherein $R_1$ is lower alkyl; $R_2$ is selected from the group consisting of hydrogen and mononuclear aryl; $R_3$ is selected from the group consisting of hydrogen, alkyl, aryl lower alkyl, lower alkenyl, lower alkynyl, cycloalkyl, pyridyl lower alkyl, lower alkoxy lower alkyl, cyano lower alkyl, di-lower alkylamino lower alkyl, mononuclear aryl, and mononuclear arylamino; $R_4$ is selected from the group consisting of hydrogen, alkyl, mononuclear aryl lower alkyl, alkyl substituted aryl lower alkyl, lower alkoxy aryl lower alkyl, haloaryl lower alkyl, di-lower alkylamino aryl lower alkyl, di-aryl lower alkyl, polyhalo aryl lower alkyl, poly lower alkyl aryl lower alkyl, poly alkoxy aryl lower alkyl, cycloalkyl, adamantyl, lower alkanocycloalkyl, aryl, lower alkenyl, lower alkynyl, mononuclear aryl substituted cycloalkyl, pyrimidyl, pyridyl, pyridyl lower alkyl, thiazolyl, nitorthiazolyl, thienyl, pyrazinyl, lower alkoxypyridazinyl, thiadiazolyl, benzothiazolyl, chlorobenzoxazolyl, lower alkyl quinolyl, lower alkoxyquinolyl, isoquinolyl, mononuclear arylamino, $N_4$-lower alkylpiperazinyl, di-lower alkylamino, di-lower alkylamino lower alkyl, amino, polymethyleneimino, halo-lower alkyl, cyano lower alkyl, cycloalkyl substituted lower alkyl, lower alkylthio lower alkyl, lower alkoxy lower alkyl, mononuclear aryloxy lower alkyl, polymethyleneimino lower alkyl, oxapolymethyleneimino lower alkyl, lower alkenyloxy lower alkyl, (3-indolyl) lower alkyl, (5-lower alkoxy-3-indolyl) lower alkyl, pyridyl lower alkyl, N-lower alkyl azapolymethylene, oxapolymethylene lower alkyl, quinuclidinyl, lower alkoxy mononuclear aryl, di-lower alkylamino-substituted mononuclear aryl, halo mononuclear aryl, nitro-mononuclear aryl, lower alkyl mononuclear aryl, trifluoromethyl mononuclear aryl, iso-lower alkylideneimino, pyridylalkylideneimino, nitrofurfurylideneimino, lower alkoxy substituted benzylideneimino;

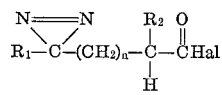

taken together is a member of the group consisting of polymethyleneimino, mononuclear aryl-substituted polymethyleneimino, mononuclear arylalkyl polymethyleneimino, lower alkyl polymethyleneimino, N-aralkyl azapolymethyleneimino, N-mononuclear aryl-substituted azapolymethyleneimino, N-lower alkyl, azapolymethyleneimino, N,N-di-lower alkylcarbamoyl polymethyleneimino, oxapolymethyleneimino, di-lower alkylamino-lower alkyl polymethyleneimino, monounsaturated polymethyleneimino, mononuclear aryl-substituted monounsaturated polymethyleneimino, benzopolymethyleneimino, lower alkyl substituted benzopolymethyleneimino, di-lower alkoxy-substituted benzopolymethyleneimino, spirocycloalkyl polymethyleneimino, lower alkano polymethyleneimino, N-polymethyleneimino polymethyleneimino; and $n$ is 0, 1, 2, or 3.

The novel compounds of the present invention may be prepared by reacting an acid halide as represented by the following formula:

$$R_1-\underset{\underset{H}{|}}{C}\underset{\underset{}{\diagdown\!\!\diagup}}{\overset{N\!\!=\!\!N}{}}(CH_2)_n-\overset{R_2}{\underset{}{|}}C-\overset{O}{\underset{}{\|}}CHal$$

wherein $R_1$, $R_2$ and $n$ are as defined above and Hal. is halogen, together with a primary or secondary amine. The acid halides may be prepared by methods described in our copending application Ser. No. 606,017, filed Dec. 30, 1966, and as described hereinafter. The reaction is preferably carried out in an inert solvent, such as benzene, toluene, xylene, chloroform, etc., and at temperatures below 40° C., preferably below 10° C. The products may be isolated and purified using conventional procedures familiar to those skilled in the art.

The novel compounds of this invention are either liquids or crystalline or wax-like solids. The compounds generally are soluble in the common organic solvents, as for example, ethanol, acetone, petroleum ether and the like. The presence of the diazirine function may be confirmed by the characteristic absorption shown by this function in the ultraviolet spectrum at 345–365 m$\mu$ and in the infrared spectrum at 6.3–6.4$\mu$.

The novel compounds of the present invention exhibit diuretic, hypoglycemic, analgesic, hypotensive, antiinflammatory, hypocholesterolemic and antibacterial activities. In addition, the compounds have been found to possess psychic stimulant and anti-depressant activities. As such, therefore, the compounds may be useful as therapeutic agents in the treatment of a wide variety of disorders, for example, edema, high blood pressure, arthritis, etc.

The following examples illustrate the preparation of representative compounds of the present invention.

EXAMPLE 1

Preparation of 4,4-azopentanamide

A solution of 12.4 g. of 4,4-azopentanoic acid and 15.4 g. of oxalyl chloride is allowed to stand 16 hours protected from atmospheric moisture. The solution is distilled, the fraction boiling at 38° C. at 5 mm. being collected as the product.

To 160 ml. of concentrated ammonium hydroxide at 0° C. is added 17.5 g. of 4,4-azopentanoyl chloride dropwise with good agitation and maintaining the temperature below 10° C. The resulting mixture is extracted with 4 or 5 portions of methylene chloride. The methylene chloride extracts are pooled and the mixture evaporated at reduced pressure. The resultant residue is crystallized from methylene chloride-hexane to give 11.9 of 4,4-azo-pentanamide melting point 89.5–91° C. The compound of this example exhibits diuretic, hypotensive and hypocholesteremic activity.

EXAMPLE 2

Preparation of 6,6-azoheptanamide

Using the method of Example 1, and substituting 6,6-azoheptanoic acid for 4,4-azopentanoic acid, the product is obtained, melting point 94–96° C.

EXAMPLE 3

Preparation of N-benzyl-4,4-azopentanamide

To 3.0 g. of benzylamine in 40 ml. of benzene at 8° C. is added dropwise a solution of 1.46 g. of 4,4-azopentanoyl chloride in 10 ml. of benzene, maintaining the temperature below 10° C. with an ice bath. The resultant mixture is stirred 2 hours, then extracted consecutively with water, 5% ice-cold aqueous hydrochloric acid, 10% aqueous sodium bicarbonate and dried over sodium sulfate. The solvent is evaporated at reduced pressure and the residue is crystallized from acetone-hexane to produce the product, melting point 65–66° C. The compound of this example exhibits hypotensive and diuretic activity.

EXAMPLES 4 AND 5

Preparation of derivatives of 4,4-azopentanoyl chloride

The following compounds are prepared using the procedure described in Example 3 using 4,4-azopentanoyl chloride and making the appropriate amine substitutions.

| Example | Amine | Product |
|---|---|---|
| 4 | Piperidine | N-(4,4-azopentanoyl)piperidine. |
| 5 | Cyclohexylamine | N-cyclohexyl-4,4-azopentanamide. |

EXAMPLE 6

Preparation of N-cyclopropyl-4,4-azopentanamide

To a solution of 1.37 g. of cyclopropyl amine and 4 ml. of triethylamine in about 30 ml. of benzene cooled in ice is added dropwise a solution of 3.5 g. of 4,4-azopentanoyl chloride in about 20 ml. of benzene. The mixture is stirred for an hour, and allowed to stand at room temperature over night. The resulting mixture is extracted with several small portions of 2 N hydrochloric acid, then with water and brine and dried over sodium sulfate. Evaporation of the solvent affords an oil that crystallizes on trituration with ether-hexane. Recrystallization gives 1.2 g. of product with melting point 39–41° C. The compound of this example exhibits diuretic and hypoglycemic activity.

EXAMPLES 7 THROUGH 40

Preparation of 4,4-azopentanamides

The following compounds prepared by the procedure described in Example 6 using 4,4-azopentanoyl chloride and the indicated amine.

| Example | Amine | Product |
|---|---|---|
| 7 | 2-methyl aziridine | 1-(4,4-azopentanoyl)-2-methylaziridine. |
| 8 | Phenethylamine | N-(β-phenethyl)-4,4-azopentanamide. |
| 9 | 1-phenyl-2-amino-propane | N-(1-methyl-2-phenylethyl)-4,4-azopentanamide. |
| 10 | 1-phenyl-2-amino-cyclopropane | N-(2-phenylcyclopropyl)-4,4-azopentanamide. |
| 11 | Aniline | N-phenyl-4,4-azopentanamide. |
| 12 | Hexamethyleneimine | N,N-hexamethylene-4,4-azopentanamide. |
| 13 | Heptamethyleneimine | N,N-heptamethylene-4,4-azopentanamide. |
| 14 | Butylamine | N-butyl-4,4-azopentanamide. |
| 15 | 2-aminothiazole | N-(2-thiazolyl)-4,4-azopentanamide. |
| 16 | Pyrrolidine | N,N-tetramethylene-4,4-azopentanamide. |
| 17 | Morpholine | 1-(4,4-azopentanoyl)-morpholine. |
| 18 | 1-aminoadamantane | N-(1-adamantyl)-4,4-azopentanamide. |
| 19 | Di-allylamine | N,N-diallyl-4,4-azopentanamide. |
| 20 | 3-pyrroline | 1-(4,4-azopentanoyl)-3-pyrroline. |
| 21 | 4-phenylpiperidine | 1-(4,4-azopentanoyl)-4-phenylpiperidine. |
| 22 | 2-ethylthioethylamine | N-(2-ethylthioethyl)-4,4-azopentanamide. |
| 23 | 1,2,3,4-tetrahydroquinoline | 1-(4,4-azopentanoyl)-1,2,3,4-tetrahydroquinoline. |
| 24 | 3-methoxyaniline | N-(3-methoxyphenyl)-4,4-azopentanamide. |
| 25 | 3-chloro-N-methylaniline | N-methyl-N-(3-chlorophenyl)-4,4-azopentanamide. |
| 26 | 4-phenyl-1,2,3,6-tetrahydropyridine | 1,(4-4-azopentanoyl)-4-phenyl-1,2,3,6-tetrahydropyridine. |
| 27 | 2-fluoro-4-methylaniline | N-(2-fluoro-4-methylphenyl)-4,4-azopentanamide. |
| 28 | Indoline | 1-(4,4-azopentanoyl)-indoline. |
| 29 | 1-aminonaphthalene | N-(α-naphthyl)-4,4-azopentanamide. |
| 30 | 1-methyl-6,7-dimethoxy-1,2,3,4-tetrahydroisoquinoline | 1-methyl-2-(4,4-azopentanoyl)-6,7-dimethoxy-1,2,3,4-tetrahydroisoquinoline. |
| 31 | 2-aminobenzothiazole | N-(2-benzothiazolyl)-4,4-azopentanamide. |
| 32 | 4-cyanoaniline | N-(4-cyanophenyl)-4,4-azopentanamide. |
| 33 | Dipropargylamine | N,N-dipropargyl-4,4-azopentanamide. |
| 34 | 3-diethylcarbamoylpiperidine | 1-(4,4-azopentanoyl)-3-diethylcarbamoylpiperidine. |
| 35 | Di-(2-cyanoethyl)amine | N,N-bis-(2-cyanoethyl)-4,4-azopentanamide. |
| 36 | Dicyclopentylamine | N,N-dicyclopentyl-4,4-azopentanamide. |
| 37 | di-n-tetradecylamine | N,N-di-n-tetradecyl-4,4-azopentanamide. |
| 38 | 5-methoxytryptamine | N-2-(5-methoxy-3-indolyl)-ethyl-4,4-azopentanamide. |
| 39 | dibenzylamine | N,N-dibenzyl-4,4-azopentanamide. |
| 40 | N,1-dimethyl-2-cyclohexylethylamine | N-methyl-N-(1-cyclohexyl-2-propyl)-4,4-azopentanamide |

The compounds of Examples 7, 8, 9, and 11 above, exhibit diuretic activity.

The compound of Example 10 exhibits antidepressant and psychic stimulant properties.

The compounds of Examples 9 and 11 also exhibit analgesic activity.

The compound of Example 7 exhibits hypoglycemic activity.

The compound of Example 9 exhibits antiinflammatory activity.

EXAMPLES 41 THROUGH 51

The following compounds are prepared using the procedure described in Example 6, substituting 5,5-azohaxanoyl chloride for 4,4-azopentanoyl chloride and making the appropriate amine substitutions as indicated in the table below.

| Example | Amine | Product |
|---|---|---|
| 41 | 2-amino-5-chlorobenzoxazole | 2-(5,5-azohexanoylamino)-5-chlorobenzoxazole. |
| 42 | N-methylaniline | N-methyl-N-phenyl-5,5-azohexanamide. |
| 43 | 4-(3-phenylpropyl)-piperidine | 1-(5,5-azohexanoyl)-4-(3-phenylpropyl)piperdine. |
| 44 | 3-azaspiro[5.5]undecane | 3-(5,5-azohexanoyl)azaspiro-[5.5]undecane. |
| 45 | 2-benzyloxyethylamine | N-(2-benzyloxyethyl)5,5-azohexanamide. |
| 46 | 2-aminothiophene | N-(2-thienyl)-5,5-azohexanamide. |
| 47 | 3-nitroaniline | N-(3-nitrophenyl)-5,5-azohexanamide. |
| 48 | 2-chloro-4-methoxyaniline | N-(2-chloro-4-methoxyphenyl)-5,5-azohexanamide. |
| 49 | 2,2,2-trifluoroethylamine | N-(2,2,2-trifluoroethyl)-5,5-azohexanamide. |
| 50 | 3-azabicyclo-[3.2.2]-cyclononane | 3-(5,5-azohexaonyl)-3-azabicyclo-[3.2.2]-cyclononane. |
| 51 | p-Methoxy benzylamine | N-(p-methoxybenzyl)-5,5-azohexahamide. |

EXAMPLES 52 THROUGH 58

The following compounds are prepared by the method described in Example 6 substituting 4,4-azo-2-phenyl pentanoyl chloride for 4,4-azopentanoyl chloride and making the appropriate amine substitution as indicated in the table below.

| Example | Amine | Product |
|---|---|---|
| 52 | Di-n-decylamine | N,N-di-n-decyl-4,4-azo-2-phenylpentanamide. |
| 53 | Di-(2-ethoxyethyl)amine | N,N-di-(2-ethoxyethyl)-4,4-azo-2-phenylpentanamide. |
| 54 | 3,4-methylenedioxyaniline | N-(3,4-methylenedioxyphenyl)-4,4-azo-2-phenylpentanamide. |
| 55 | 4-trifluoromethylaniline | N-(4-trifluoromethylphenyl)-4,4-azo-2-phenylpentanemide. |
| 56 | N-methyl-N-tetrahydrofurfurylamine. | N-methyl-N-tetrahydrofuryl-4,4-azo-2-phenylpentanamide. |
| 57 | 2-norbornyl benzyl amine | N-benzyl-N-(2-norbornyl)-4,4-azo-2-phenylpentanamide. |
| 58 | Tryptamine | N-[2-(3-indolyl)ethyl]-4,4-azo-2-phenylpentanamide. |

EXAMPLES 59 THROUGH 62

The following compounds are prepared by the method described in Example 6, substituting 6,6-azo-heptanoyl chloride for 4,4-azopentanoyl chloride and making the appropriate amine substitution as indicated in the table below.

| Example | Amine | Product |
|---|---|---|
| 59 | Benzylamine | N-benzyl-6,6-azoheptanamide. |
| 60 | Diethylamine | N,N-diethyl-6,6-azoheptanamide. |
| 61 | 2-phenylcyclopropyl amine | N-(2-phenylcyclopropyl)-6,6-azoheptanamide. |
| 62 | Butylamine | N-butyl-6,6-azoheptanamide. |

EXAMPLE 63

Preparation of N,N'-diphenyl-4,4-azopentanoyl hydrazide

To a stirred mixture of 2.5 g. of 1,2-diphenyl hydrazine in 30 ml. of benzene and 5 ml. of 5 N aqueous sodium hydroxide is added slowly a solution of 1.7 g. of 4,4-azopentanoyl chloride in about 30 ml. of benzene with water bath cooling. The mixture is stirred an hour and filtered. The precipitate is recrystallized from methylene chloride-hexane ot yield 1.16 g. of product as a pale yellow solid.

EXAMPLE 64

Preparation of N-(1-methyl-2-phenylethyl)-4,4-azo-2-phenyl-pentamide

The above compound is prepared using 4,4-azo-2-phenyl-pentanoyl chloride and 1-phenyl-2-aminopropane according to the procedure described in Example 3 and using hexane as the recrystallization solvent. The product melts at 88–92° C.

EXAMPLE 65

Preparation of N-(1-methyl-2-phenylethyl)-5,5-azohexanamide

A solution of 2.8 g. of 5,5-azohexanoic acid and 6 ml. of oxalyl chloride as allowed to stand 16 hours at room temperature. Excess oxalyl chloride is distilled off at reduced pressure, the residue is treated with 30 ml. of dry benzene and the benzene is evaporated at reduced pressure to a residual volume of about 5 ml. The residue is treated with 30 ml. of dry benzene and used without further purification.

The above compound may be prepared using 5,5-azohexanoyl chloride and 1-phenyl-2-aminopropane according to the procedure described in Example 3. The product crystallizes from hexane below room temperature.

EXAMPLE 66

Preparation of N-(3-pyridyl)-4,4-azopentanamide

A solution of 940 mg. of 3-aminopyridine and 2 ml. triethylamine in 50 ml. of dry benzene is cooled to 6° C. To this stirred solution is added dropwise 1.28 g. of 4,4-azo-pentanoyl chloride in 10 ml. of dry benzene, keeping the temperature below 10° C. The resulting solution is stirred at 25° C. for 2 hours and washed with two 20 ml. portions of water. The organic solution is extrated with two 15 ml. portions of 2 N hydrochloric acid. The aqueous extracts are combined, washed with benzene, made basic with sodium bicarbonate and the crude product is extracted into methylene chloride. The residue remaining after evaporation of the methylene chloride at reduced pressure is recrystallized from acetone-hexane to give pale yellow crystals, melting point 68.5–70.5° C. The compound of this example exhibits hypoglycemic activity.

EXAMPLES 67 THROUGH 88

Preparation of derivatives of 4,4-azopentanoyl chloride

The following compounds may be prepared by the procedure described in Example 66 using 4,4-azopentanoyl chloride and making the amine substitutions indicated in the table below.

In Examples 67, 70, and 71, the products are isolated as the hydrochloride salt by addition of gaseous hydrogen chloride to an ethereal solution of the product, filtering the precipitate and recrystallizing from ethanol-ether.

| Example | Amine | Product |
|---|---|---|
| 67 | N-methylpiperazine | N-methyl-N'-(4,4-azopentanoyl)piperazine hydrochloride. |
| 68 | N-methyl-N'-aminopiperazine. | N-methyl-N'-(4,4-azopentanoylamino)-piperazine. |
| 69 | β-dimethylaminoethylamine. | N-(β-dimethylaminoethyl)-4,4-azopentanamide. |
| 70 | 1,1-dimethylhydrazine | N,N-dimethyl-N'-(4,4-azopentanoyl)-hydrazine hydrochloride. |
| 71 | 4-phenylpiperazine | 1-(4,4-azopentanoyl)-4-phenylpiperazine. |
| 72 | 4-dimethylamino aniline | N-(4-dimethylaminophenyl)-4,4-azopentanamide. |
| 73 | 2-diethylaminomethyl-piperidine. | 1-(4,4-azopentanoyl)-2-diethylaminomethyl piperidine. |
| 74 | 3-benzylaminoquinuclidine | N-benzyl-N-(3-quinuclidinyl)-4,4-azopentanamide. |
| 75 | 1-ethyl-3-amino-piperidine | 1-ethyl-3-(4,4-azopentanoylamino)-piperidine. |
| 76 | 1-(2-aminoethyl)-morpholine. | N-(2-morpholinoethyl)-4,4-azopentanamide. |
| 77 | 4-benzylpiperazine | 1-(4,4-azopentanoyl)-4-benzylpiperazine. |
| 78 | 4-(1-piperidyl)-piperidine | 1-(4,4-azopentanoyl)-4-(1-piperidyl)-piperidine. |
| 79 | 6-methoxy-8-aminoquinoline. | 6-methoxy-8-(4,4-azopentoylamino)-quinoine. |
| 80 | 1-aminopiperidine | N-(1-piperidyl)-4,4-azopentanamide. |
| 81 | N'N,N'-trimethylethylene diamine. | N-methyl-N-(2-dimethylaminoethyl)-4,4-azopentanamide. |
| 82 | 8-aminoisoquinoline | N-(8-isoquinolyl)-4,4-azopentanamide. |
| 83 | Phenylhydrazine | N-anilino-4,4-azopentanamide. |
| 84 | 1-(3-aminopropyl)-piperidine. | N-[3-(1-piperidyl)propyl]-4,4-azopentanamide. |
| 85 | Di-(3-pyridylmethyl)-amine. | N,N-di-(3-pyridylmethyl)-4,4-azopentanamide. |
| 86 | 4-aminomethylpyridine | N-(4-pyridylmethyl)-4,4-azopentanamide. |
| 87 | 2-(β-aminoethyl)-pyridine | N-(2-[4-pyridyl]-ethyl)-4,4-azopentanamide. |
| 88 | p-Dimethylaminobenzylamine. | N-(p-dimethylaminobenzyl)-4,4-azopentanamide. |

EXAMPLE 89

Preparation of 4,4-azopentanoyl hydrazide

A solution of 5.0 g. of hydrazine hydrate in 5.0 ml. of methanol is refluxed while 7.0 g. of methyl 4,4-azopentanoate is added dropwise over a one hour period. The solution is stirred 15 minutes at reflux and cooled. After dilution with 100 ml. of brine and acidification to pH 3 with hydrochloric acid, the solution is extracted with ether, made strongly alkaline with solid hydroxide and the product is extracted into ether. On evaporation of the solvent, a waxy solid is obtained, melting point 38–40° C. The compound of this example exhibits analgesic and diuretic activity.

EXAMPLE 90

Preparation of N-(5-nitrofurfurylidine)-4,4-azopentanoyl hydrazide

A solution of 0.300 g. of acetic acid and 0.630 g. of 4,4-azopentanoyl hydrazide in 3 ml. of ethanol and 2 ml. of water is stirred while 0.705 g. of 4-nitrofurfuraldeyde in 3 ml. of ethanol is added. The product is filtered after 20 minutes and recrystallized from methylene chloride-hexane to give 0.623 g. of fine yellow needles, melting point 146–148° C. (dec.). The compound of this example exhibits antibacterial activity.

EXAMPLE 91

Preparation of N-(3-methoxybenzylidenimino)-4,4-azopentanamide

Using the method of Example 90 and substituting 3-methoxybenzaldehyde for 4-nitrofurfuraldehyde, the above product is obtained as long needles, melting point 98–100° C.

The product of this example exhibits analgesic and diuretic activity.

EXAMPLE 92

Preparation of N-isopropylidine-4,4-azopentanoyl hydrazide

A solution of 1 g. of 4,4-azopentanoyl hydrazide in about 5 ml. of acetone is cooled. The crystals which form are collected by filtration and recrystallized from acetone to give the product, melting point 50.5–52° C. The compound of this example exhibits diuretic activity.

EXAMPLE 93

Preparation of N-[1-(4-pyridyl)ethylidene]-4,4-azopentanoyl hydrazide

A solution of 1.008 g. of 4,4-azopentanoyl hydrazide, 0.428 g. of acetic acid, 3 ml. of water and 9 ml. of ethanol is stirred at room temperature while a solution of 0.738 g. of 4-acetyl pyridine in 4 ml. of ethanol is added. The solution is allowed to stand 48 hours after which time it is partially evaporated. The residue is recrystallized from methylene chloride-hexane to give the product as glistening plates, melting point 91–94° C.

EXAMPLE 94

Preparation of N-(2-pyrimidyl)-4,4-azopentanamide

A solution of 2.8 g. of 2-aminopyrimidine in 40 ml. of pyridine is ice-cooled and 4.1 g. of 4,4-azopentanoyl chloride is added in portions with vigorous stirring. The pyridine is evaporated under reduced pressure, the residue is washed with water, and recrystallized from benzene-hexane to afford 2.0 g. of crystals, melting point 96–97° C. The compound of this example exhibits analgesic, hypotensive, diuretic, and hypocholesteremic activity.

EXAMPLE 95

Preparation of N-(2-vinyloxyethyl)-4,4-azopentanamide

Using the procedure of Example 94 and substituting 2-vinyloxyethylamine for 2-aminopyrimidine, the above product is attained.

EXAMPLE 96

Preparation of N-(2-pyridyl)-4,4-azopentanamide hydrochloride salt

A solution of 1.90 g. of 2-aminopyridine and 7 ml. triethylamine in 50 ml. of chloroform is stirred while cooling in ice and 2.90 g. of 4,4-azopentanoyl chloride in 20 ml. chloroform is added in portions keeping the temperature below 20° C. The mixture is stirred 16 hours and extracted with one 20 ml. portion of 5 N sodium hydroxide, three 20 ml. portions of water, and one 20 ml. portion of brine, and then dried over magnesium sulfate. The washed solution is evaporated at reduced pressure and the residue is dissolved in a small amount of ether and hydrogen chloride is bubbled into the solution. The precipitate is filtered and recrystallized from ethanol-ether to give the product, melting point 147–148° C. The compound of this example exhibits diuretic and analgesic activity.

EXAMPLES 97 THROUGH 101

The following compounds are prepared by the procedure described in Example 96 making the amine substitutions indicated in the table below.

| Example | Amine | Product |
| --- | --- | --- |
| 97 | 4-amino-2-methylquinoline | N-(4-[2-methylquinolinyl])-4,4-azopentanamide. |
| 98 | 2-amino-5-nitrothiazole | N-(5-nitrothiazolyl-2)-4,4-azopentanamide. |
| 99 | 2-ethylaminothiadiazole | N-ethyl-N-(2-thiadiazolyl)-4,4-azopentanamide. |
| 100 | 2-aminopyrazine | N-(2-pyrazinyl)-4,4-azopentanamide. |
| 101 | 3-amino-6-methoxy-pyridazine | 3-(4,4-azopentanoylamino)-6-methoxypyridazine. |

EXAMPLE 102

Preparation of N,N-dimethyl-4,4-azopentanamide

A solution of 3 ml. of triethylamine in 16 ml. of a 25% aqueous solution of dimethylamine is stirred at −5° C. and 3.2 g. of 4,4-azopentanoyl chloride is added dropwise. The tan solution is stirred for 2½ hours with warming to room temperature. The solution is saturated with sodium chloride and extracted with several portions of ether. The combined extracts are washed with brine containing some hydrochloric acid, then dried. The solvent is evaporated and the residue is distilled, boiling point 58° C. at 0.2 mm.

The product of this example exhibits analgesic and diuretic activity.

EXAMPLES 103 THROUGH 111

The following compounds are prepared by the procedure described in Example 6 using 4,4-azopentanoyl chloride and making the indicated amine substituent.

| Example | Amine | Product |
| --- | --- | --- |
| 103 | p-Methylbenzylamine | N-(p-methylbenzyl)-4,4-azopentanamide. |
| 104 | m-Bromobenzylamine | N-(m-bromobenzyl)-4,4-azopentanamide. |
| 105 | o-Fluorobenzylamine | N-(o-fluorobenzyl)-4,4-azopentanamide. |
| 106 | 3,4-dimethoxybenzylamine | N-(3,4-dimethoxybenzyl)-4,4-axopentanamide. |
| 107 | 2,3-dimethylbenzylamine | N-(2,3-dimethylbenzyl)-4,4-axopentanamide. |
| 108 | α-Phenylbenzylamine | N-diphenylmethyl-4,4-azopentanamide. |
| 109 | 1,4-dichlorobenzylamine | N-(1,4-dichlorobenzyl)-4,4-axopentanamide. |
| 110 | 1-aminomethyl naphthalene | N-(1-napthylmethyl)-4,4-zaopentanamide. |
| 111 | o-Chlorobenzylamine | N-(1-chlorobenzyl)-4,4-azopentanamide. |

We claim:

1. A diazirine of the formula:

$$R_1-\underset{\underset{N}{\overset{N}{\|}}}{C}-CH_2-CH_2-\underset{O}{\overset{\|}{C}}-N\underset{R_4}{\overset{R_3}{\diagup}}$$

wherein $R_1$ is lower alkyl; $R_3$ is selected from the group consisting of hydrogen and lower alkyl; $R_4$ is selected from the group consisting of hydrogen, phenyl lower alkyl, cyclolower alkyl, phenyl cyclolower alkyl, phenyl, lower alkyl, pyridyl, pyrimidyl, amino, isolower alkylidene-imino, nitrofurfurylideneimino and lower alkoxy benzylidieneimino and $$-N\underset{R_4}{\overset{R_3}{\diagup}}$$

taken together is lower alkylaziridino.

2. The diazirine compound according to claim 1: N-cyclopropyl-4,4-azopentanamide.

3. The diazirine compound according to claim 1: 1-(4,4-azopentanoyl)-2-methylaziridine.
4. The diazirine compound according to claim 1: N-benzyl-4,4-azopentanamide.
5. The diazirine compound according to claim 1: N(1-methyl-2-phenylethyl)-4,4-azopentanamide.
6. The diazirine compound according to claim 1: N-(3-pyridyl)-4,4-azopentanamide.
7. The diazirine compound according to claim 1: N-(2-phenylcyclopropyl)-4,4-azopentanamide.
8. The diazirine compound according to claim 1: 4,4-azopentanamide.
9. The diazirine compound according to claim 1: N-isopropylidine-4,4-azopentanoyl hydrazine.

References Cited

UNITED STATES PATENTS 3,345,369    10/1967    Sassiver et al. _____ 260—243

OTHER REFERENCES

Wagner et al.: Synthetic Organic Chemistry, New York, 1953, page 566.

ALTON D. ROLLINS, Primary Examiner

U.S. Cl. X.R.

260—288, 296, 326.11, 294, 347.3, 247.2, 295, 256.4, 240, 306.8, 332.2, 250, 305, 307, 287, 268, 326.14, 294.7, 326.5, 999, 247.5